United States Patent [19]

Yoshikawa

[11] Patent Number: 5,081,526
[45] Date of Patent: Jan. 14, 1992

[54] COPYING APPARATUS WHICH USES THERMALLY DEVELOPABLE PHOTOSENSITIVE MATERIALS

[75] Inventor: Sumio Yoshikawa, Kanagawa, Japan

[73] Assignee: Fuji Photo Film Co., Ltd., Kanagawa, Japan

[21] Appl. No.: 581,152

[22] Filed: Sep. 10, 1990

Related U.S. Application Data

[63] Continuation of Ser. No. 207,424, Jun. 16, 1988, abandoned.

[30] Foreign Application Priority Data

Jun. 16, 1987 [JP] Japan .................. 62-147821

[51] Int. Cl.$^5$ .............................................. H04N 1/46
[52] U.S. Cl. ........................... 358/75; 250/317.1; 346/108
[58] Field of Search ............... 358/75, 80; 250/317.1, 250/318.1, 319.1; 346/108

[56] References Cited

U.S. PATENT DOCUMENTS

| | | | |
|---|---|---|---|
| 4,566,043 | 1/1986 | Tamura | 358/296 X |
| 4,620,096 | 10/1986 | Takehara et al. | 250/319.1 |
| 4,681,427 | 6/1987 | Plummer | 358/75 X |
| 4,728,965 | 3/1988 | Kessler et al. | 346/108 |
| 4,734,763 | 3/1988 | Urabe et al. | 358/80 |
| 4,737,822 | 4/1988 | Taniguchi et al. | 250/319.1 X |
| 4,752,822 | 6/1988 | Kawamura | 358/80 |
| 4,783,683 | 11/1988 | Nagumo et al. | 355/27 |
| 4,789,892 | 12/1988 | Tsuzuki et al. | 358/75 X |
| 4,797,710 | 1/1989 | Ishikawa | 355/27 |
| 4,800,275 | 1/1989 | Shimuzu et al. | 355/27 X |
| 4,821,113 | 4/1989 | McQuade et al. | 346/108 X |
| 4,824,220 | 4/1989 | Yamamoto et al. | 372/22 X |
| 4,825,074 | 4/1989 | Yoshikawa | 250/317.1 |

FOREIGN PATENT DOCUMENTS

63-167554 7/1988 Japan .

Primary Examiner—James J. Groody
Assistant Examiner—Mark R. Powell
Attorney, Agent, or Firm—Sughrue, Mion, Zinn, Macpeak & Seas

[57] ABSTRACT

Copying apparatus includes an image reading device which scans the original document photoelectrically and provides read-out tri-color separation signals, an image processing device in which the aforementioned read-out tri-color separation signals are subjected to a prescribed image processing, an exposing device which subjects a thermally developable color photosensitive material to a tri-color exposure in accordance with the output signals from the image treatment device, and a thermal development and transfer device in which the exposed color photosensitive material is thermally developed and transferred onto image receiving material layer.

18 Claims, 3 Drawing Sheets

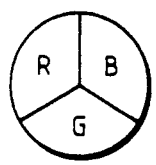
FIG. 3
FIG. 4
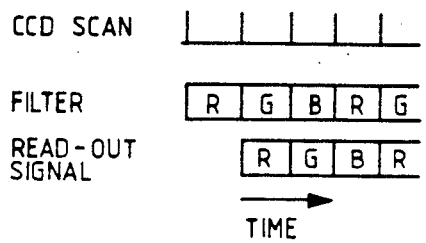
FIG. 5
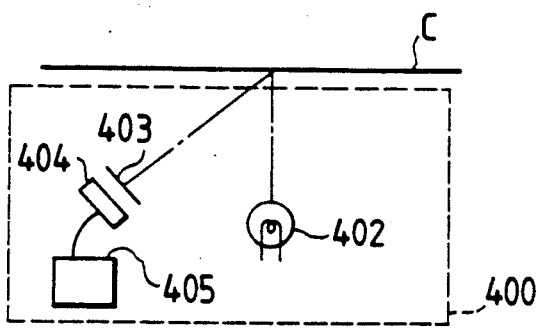
FIG. 6
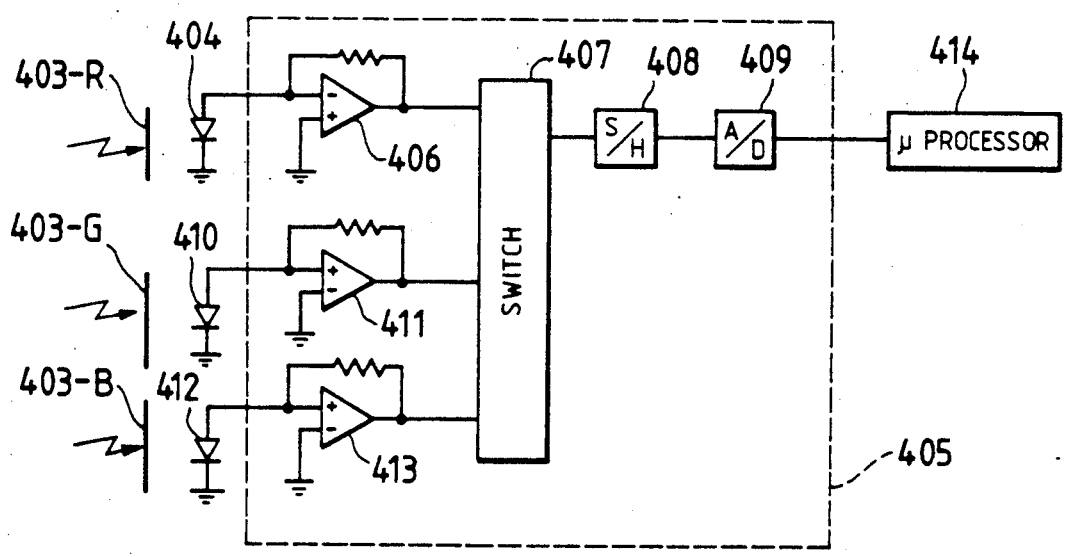
FIG. 7
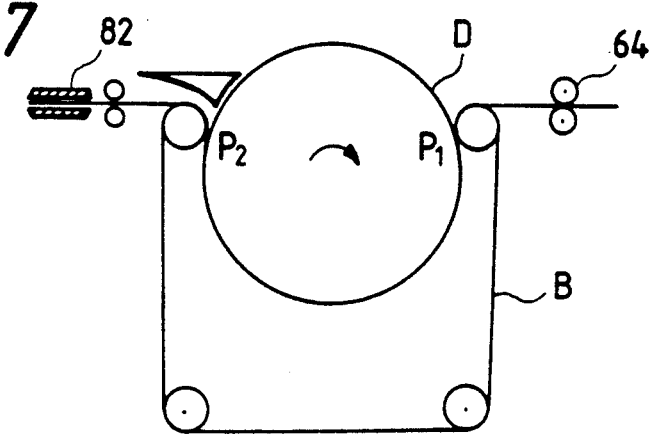

COPYING APPARATUS WHICH USES THERMALLY DEVELOPABLE PHOTOSENSITIVE MATERIALS

This is a continuation of application Ser. No. 07/207,424 filed June 16, 1988 now abandoned.

BACKGROUND OF THE INVENTION

This invention concerns copying apparatus in which an image is formed using thermally developable photosensitive materials.

Conventionally, electrophotographic systems, ink jet systems, etc. have been used for copying color originals. In electronic copying systems, electronic latent images corresponding to an original are generally formed on a charged photosensitive drum by exposing the color original using blue, green and red color separation filters. The colored image is reproduced by developing each of the latent images using a succession of yellow, magenta, cyan, etc. color toners, transferring the colored images formed with each of the color toners, in alignment, onto the same sheet of recording paper, fixing the image with heat, etc. With the ink jet system, the color original is color separated using color filters, etc. and quantities corresponding to the intensities of the colors are stored in a memory. Subsequently, ink of each color is discharged from nozzles in accordance with the memory content to reproduce the colored image.

Apparatus in which the desired color original is copied using silver halide color photosensitive material is also known. For example, the color copying apparatus available commercially under the trade name "Cibachrome Color Copy CC-001" (made by the Ciba-Geigy co.) is a copying apparatus in which a colored image is reproduced using a silver dye bleach type (SDB type) color photosensitive material in which azo dyes are combined with photosensitive silver halide. In such copying apparatus where color photosensitive materials are used there is no need for a memory for storing the image information like that used with the ink jet systems and the problem of color fringing, which arises because of the alignment of a plurality of toner images as used in electronic copying systems, does not arise, and there is a further advantage in that high quality color images can be reproduced with a single exposure.

In normal copying apparatus the original document takes the form of a color positive and a reversal color photosensitive material in the form of a multi-layer color photosensitive material with which a color positive image can be obtained from a color positive original. Multi-layer photosensitive materials consisting of photosensitive silver halide emulsion layers generally form colored images by means of an alkaline development process following exposure. However, in the case of a reversal color photosensitive material, the color positive image is obtained via a complicated process including a stage in which the exposed parts of the silver halide emulsion layers after exposure are subjected to a black and white development process, a stage in which the unexposed parts of the silver halide emulsion layers are exposed to light, a stage in which the unexposed parts of the silver halide emulsion layers which have been exposed at this time are subjected to a color development process, and a stage in which the material is subjected to a bleach-fixing process in order to remove the silver image which has been formed by the development processes. Furthermore, complicated processing involving at least 3 stages is normally required to obtain a colored image from the aforementioned SDB type color photosensitive materials.

As has been described above, color separation of the colored original must be carried out to reproduce a colored image using the electronic copying system or the ink jet system and so at least three exposures are required and a very large memory may be required to store the image information. Moreover, in the electronic copying system, the image quality is reduced by color fringing, etc., and with the ink jet system, there is a further disadvantage in that a long period of time is required to form the copy image. Furthermore, in copying apparatus in which color photosensitive materials are used, the post exposure development processing is complex and additional skill is required to managing the processing baths and the apparatus is large in size and the manufacturing cost is high.

It is also known to obtain colored images by thermal development. Thermally developable color photosensitive materials with which an image can be obtained by thermal development and the processing thereof have been described on pages 242-255 of "The Fundamentals of Photographic Engineering, Non-silver Halide"Vol. (1982, published by Corona), on page 40 of "Image Information", published in April 1978, and on pages 32-33 of Neblett's Handbook of Photography and Reprography, 7th Ed., (published by the Van Nostrand Reinhold Company).

Additionally, other methods have been suggested for obtaining color images by thermal development. Thus, methods in which a mobile dye is released imagewise by heating and the mobile dye transferred by means of a solvent such as water to a dye fixing material (image receiving material) which has a mordant, methods in which the dye is transferred to a dye fixing material by means of a high boiling point organic solvent, methods in which the dye is transferred to the dye fixing material by means of a hydrophilic hot solvent which is incorporated into the dye fixing material, and methods in which the mobile dye is thermally diffusible or sublimable and transferred to a dye receiving material have been suggested. See U.S. Pat. Nos. 4,463,079; 4,474,867; 4,478,927; 4,507,380; 4,500,626; and 4,483,914; and Japanese Patent application (OPI) Nos. 149,046/83; 149,047/83; 152,440/84; 154,445/84; 165,054/84; 170,548/84; 168,469/84; 174,832/84; 174,833/84; 174,834/84; and 174,835/84. With progress being made in office automation, the space occupied by machinery is constantly increasing and miniaturization of machinery is becoming an essential requisite.

SUMMARY OF THE INVENTION

Objects of this invention are to provide copying apparatus in which the disadvantages of the conventional systems mentioned above are overcome, with which there is no need for multiple exposures and complex development processing, and with which high quality color images can be reproduced easily using small apparatus.

The above mentioned objects are realized with the apparatus of the invention which has an image reading device to scan the original document photoelectrically and provide read-out tri-color separation signals, an image processing device in which the aforementioned read-out tri-color separation signals are subjected to a prescribed image processing, an exposing device which subjects a thermally developable color photosensitive material to a tri-color exposure in accordance with the output signals from the said image treatment device, and a thermal development and transfer device in which the said exposed color photosensitive material is thermally developed and thermally transferred onto the image receiving material layer.

Thus, after subjecting a thermally developable color photosensitive material to tri-color exposure by means of the aforementioned exposing device, the latent image which has been transformed in the aforementioned photosensitive material is developed and the image is transferred to an image receiving material layer by heat from a thermal development transfer device.

BRIEF DESCRIPTION OF THE DRAWINGS

FIG. 3 is an enlarged diagram of the filter illustrated in FIG. 2;

FIG. 4 is a diagram showing the timing correspondence between the filter and the CCD sensor of FIG. 2;

FIG. 5 is an outline drawing of the image receiving paper sensor; and

FIG. 6 is a block diagram of the computing circuit in the image receiving paper sensor.

FIG. 7 shows another embodiment of the thermal development and transfer device as shown in FIG. 1.

DETAILED DESCRIPTION OF THE PREFERRED EMBODIMENTS

Figure 1:
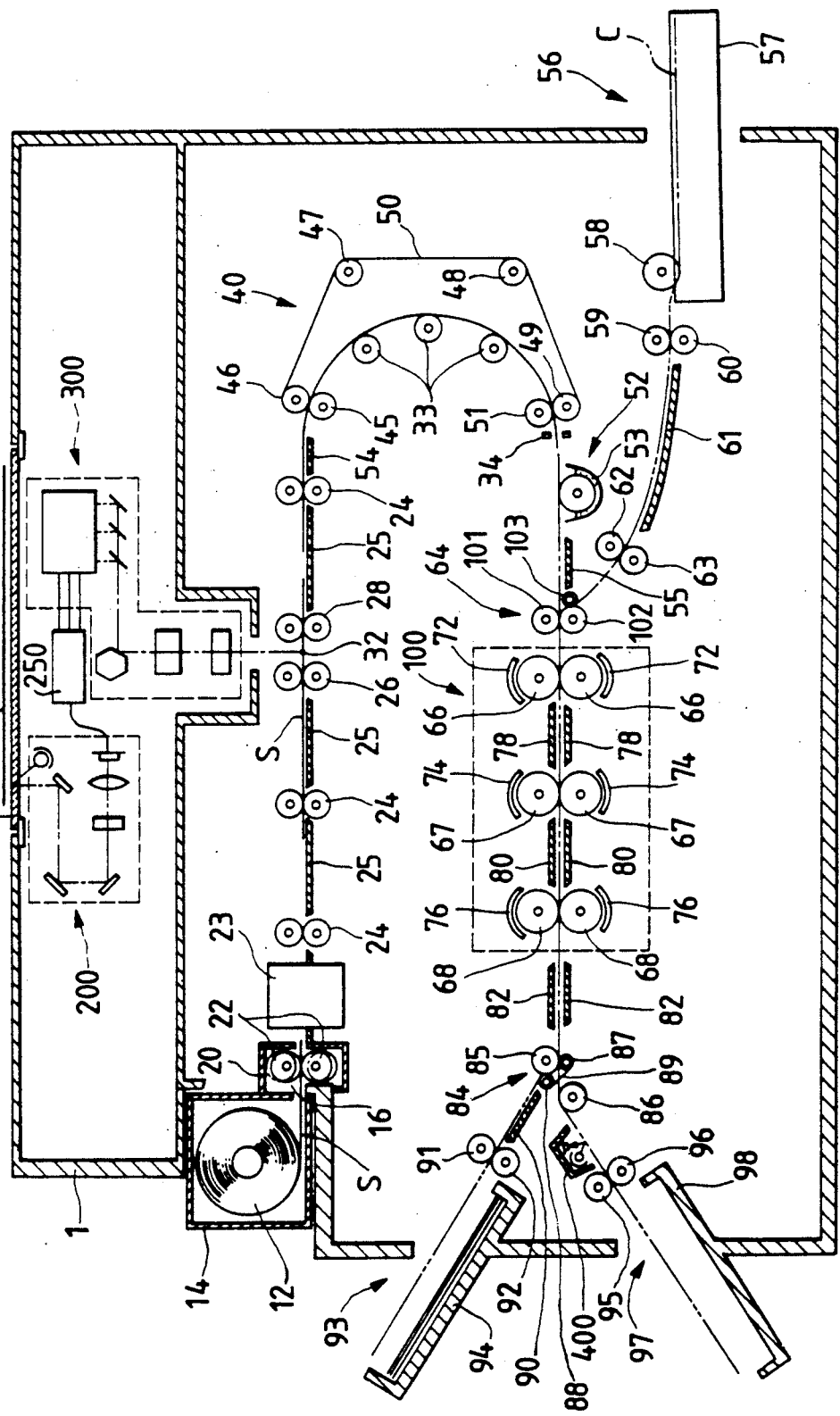
FIG. 1 illustrates an embodiment of the invention.

The thermally developable photosensitive materials used in this invention are constructed with a photosensitive material which has a photosensitive layer a dye which fixing layer which is able to capture the hydrophilic and diffusable dyes which are formed in the photosensitive layer.

The method for forming the dye image involves the transfer of a mobile dye which has been formed or realeased by thermal development. For this purpose the use of a photosensitive material is preferred which has a photosensitive layer having, on a support, a photosensitive silver halide, a dye donating substance, a binder, one of an organic silver salt or reducing agent, and a dye fixing material which can capture the mobile dye which diffuses from a photosensitive element.

Actual examples of the above mentioned photosensitive materials and dye fixing materials have been disclosed in Japanese Patent Application (OPI) No. 253,159/87.

The photosensitive layer and the dye fixing layer can be formed on the same support or they can be formed on separate supports. The fixing layer and the photosensitive layer can be peeled apart. For example, uniform thermal development can be carried out after imagewise exposure. Then, the dyes fixing layer and the photosensitive layer can be peeled apart. Furthermore, in cases where a photosensitive element consisting of a photosensitive layer which has been coated on a support, and a dye fixing element consisting of a dye fixing layer which has been coated on a support are formed separately, the diffusible dye can be transferred to the fixing layer by laminating the fixing element onto the imagewise exposed photosensitive element and heating uniformly in the presence of water.

The dye fixing layer may, for example, contain a dye mordant for fixing the dye. A variety of mordants can be used for this purpose, polymer mordants are especially useful. This layer may also contain bases, base precursors, etc. and hot solvents as well as mordants. The inclusion of bases and base precursors in the fixing layer is especially useful in cases where the photosensitive layer and the dye fixing layer are formed on separate supports.

The ways in which a photosensitive element and a dye fixing element are formed on separate supports can be generally classified into two types, namely a peelable type and a type where peeling is unnecessary. In the case of the peelable type, the coated surface of the photosensitive element and the coated surface of the dye fixing element are laminated together after imagewise exposure and, after the formation of the transfer image, the photosensitive element is quickly peeled away from the dye fixing element. An opaque or transparent support can be selected for the dye fixing layer according to whether the final image is to be of the reflection type or of the transmission type. Furthermore, a white reflecting layer may be established by coating as required. In cases where peeling apart is unnecessary, a white reflecting layer must be incorporated between the photosensitive layer of the photosensitive element and the dye fixing layer of the dye fixing element. The white reflecting layer may be coated and established on either the photosensitive element or the dye fixing element. The support of the dye fixing element must be transparent in this case.

The type in which peeling of the photosensitive element from the image receiving element is unnecessary is typical of the form in which the photosensitive element and the dye fixing element are coated and established on the same support. In this case the photosensitive layer, dye fixing layer and white reflecting layer can be laminated onto a transparent or an opaque support.

An illustrative example of the invention is described below with reference to the attached drawings. As shown in the cross sectional view in FIG. 1, the first illustrative example has an original document supporting glass plate 2 on the upper surface of the housing 1 and the original document 5 is placed facing down on the upper surface of the glass plate 2.

The image reading device 200, the image processing device 250 and the exposing device 300 are provided below the position of the original document glass plate 2 and the thermally developable photosensitive material S (referred to below as the photosensitive material) is exposed imagewise and a latent image is formed.

The photosensitive material cartridge 14 in which the photosensitive material roll 12 on which the photosensitive material S is wound is housed inside the housing 1 in such a way that it can be easily replaced. A pair of photosensitive material delivery rolls 22, 22, housed in the magazine dark box 20, are arranged at the exit 16 for the photosensitive material S and a fixed length of the photosensitive material is delivered by these rolls at the prescribed times. The photosensitive material delivery rolls 22, 22 move apart as shown in the dotted lines when the leading end part of the photosensitive materials S has been advanced to facilitate running of the photosensitive material. The cutter unit 23 for cutting the photosensitive material S, a plurality of feed rolls 24, and a plurality of guide plates 25 are established in front of the magazine dark box 20 (here and below, the term "in front of" signifies a position downstream in respect of the running direction of the photosensitive material).

Two pairs of nip rolls 26, 28, are established in the transporting path of the photosensitive material S formed by the pairs of feed rolls 24 and the guide plates 25 so that the photosensitive material S is passed through the exposure position for the exposing device 300. A pair of feed rolls 24 and a guide plate 25 are established in front of the nip roll pair 28. The turning device 40 which turns the exposed photosensitive material S over is established in front of the nip roll pair 28 and its forward feed rolls 25. This turning device 40 has an endless belt 50 which is supported by the four belt supporting rolls 46, 47, 48, 49 and fitted so as to form an arc of about 180° by the feed rolls 33 and the nip rolls 45, 51 which are in press contact with the supporting rolls 46, 49.

The turning device 40 also has a guide plate 54 which guides the photosensitive material S fed out from the nip roll pair 28 onto the nip roll 45, and a photosensitive material end detecting sensor 34 positioned in front of the nip roll 51.

A water coating portion 52 is established in front of the photosensitive material end detecting sensor 34. The water contained in the tank 53 coats the photosensitive material S in the water coating portion 52, and the water coated photosensitive material S is then guided by the guide plate 55 and fed into the contact part of the pressure rolls 101, 102 of the photosensitive material/image receiving paper laminating device 64.

The image receiving paper supply device 56 is established below the turning device 40. The image receiving paper supply device 56 consists of the image receiving paper supply cassette 57 which protrudes from the housing 1 such that it can be easily changed. The image receiving paper delivery roll 58 delivers the image receiving paper C from inside the cassette 57, and the feed rolls 59, 60, 62, 63 guide the image receiving paper C along the guide plate 61 and into the contact part of the pressure roll 102 and the nip roll 103.

The aforementioned water coating part 52 may be established in front of the image receiving paper feed device 60 to water coat the image receiving paper and, moreover, in cases where the photosensitive material does not need to be coated with water, the water coating part 52 can be omitted.

The photosensitive material/image receiving paper laminating device 64, consisting of the pressure rolls 101, 102, can be replaced by the first heating roller 66 of the thermal development and transfer device 100 described hereinafter.

The thermal development and transfer device 100 is established in front of the photosensitive material/image receiving paper laminating device 64. A first pair of heating rollers 66, a second pair of heating rollers 67 and a third pair of heating rollers 68 are established with a prescribed spacing in the thermal development and transfer device 100.

The heating guide plates 78, 80 are arranged sandwiching the transport path of the thermally developable photosensitive material S and the image receiving paper C between the first heating roller 66 and the second heating roller 67, and between the second heating roller 67 and the third heating roller 68, respectively. Heaters are established in each of the heating guide plates 78, 80. The first heating roller 66, the second heating roller 67 and the third heating roller 68 are all driven in such a way that their rotation is synchronized by means of a motor (not shown) which drives all of the devices.

The first heating roller 66, the second heating roller 67 and the third heating roller 68 are made of rubber and each is furnished with a drive shaft consisting of an electrically conductive material. The heaters 72, 74 and 76 are established along the axial directions of each heating roller on the outer circumferences of the first heating roller 66, the second heating roller 67 and third heating roller 68, respectively. Each of the heaters 72, 74 and 76 is provided with a plurality of heating elements (not shown) along the axial direction of each heating roller 66, 67, 68, so that each heating roller can be heated at a number of locations. These heaters 72, 74 76 are connected to an electrical power supply (not shown) by way of a control device (not shown).

The photosensitive material/image receiving paper peeling device 84 is established via the guide 82 in front of the thermal development and transfer device 100. The photosensitive material/image receiving paper peeling device 84 consists of a first feed roll 85, a second feed roll 86 and peeling belts 89 suspended on the guide rolls 87, 88 in such a way that they make a press contact only on the photosensitive material S at the two outer edges of the first feed roll 85.

The photosensitive material reservoir 93 is established on the upper side of the peeling device 84 and the image receiving paper retrieval part 97 is established on the lower side. The photosensitive material reservoir 93 consists of the guide part 90, a pair of feed rolls 91, 92 and a reservoir 94. The photosensitive material S fed from the peeling device 84 and guided by the guide part 90 is dumped in the reservoir by the feed rolls 91, 92. The image receiving paper retrieval part 97 which has a pair of feed rolls 95, 96 and a retrieval tray 98 and which accepts the image receiving paper C, protrudes from the housing 1.

Figure 2:
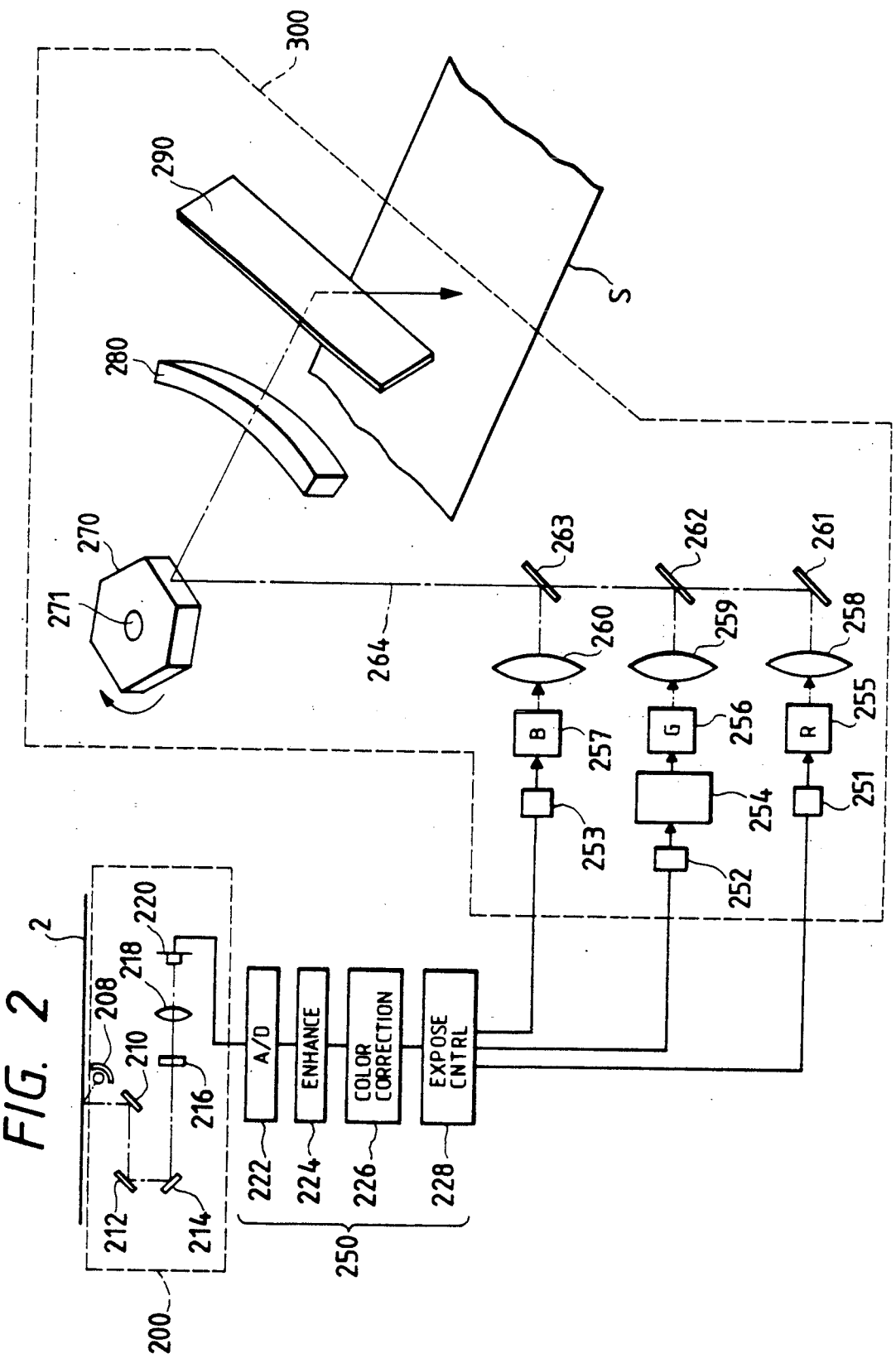
FIG. 2 is a diagram of the exposing pathway from the image reading device to the exposing device of the invention.

An enlarged view showing the exposure pathway from the image reading device 200, through the image processing device 250 and up to the exposing device 300 is shown in FIG. 2. The image reading device 200 is constructed from an illuminating lamp 208 and a mirror 210 which scan in unison the whole surface of the lower side of the glass plate 2, mirrors 212, 214 which move in the same direction as, and at half the speed of, the illuminating lamp 208 and which reflect the light of the illuminating lamp 208 in said direction, a liquid crystal filter unit 216 which time divides the light from the mirror 214 and achieves a tri-color separation by means of three color regions arranged in a plane perpendicular to the optical axis, as shown in FIG. 3, an image forming lens 218, and a CCD sensor 220 in which photoelectric conversion is carried out. Thus, the light from the mirror 214 is repeatedly tri-color time divided by rotating the aforementioned filter unit 216 at a constant high speed by means of a drive device (not shown), and light of each color is directed sequentially onto the CCD sensor 220. The scanning of the CCD sensor unit and the rotation of the filter unit 216 are synchronized so that light of one certain color is directed onto the CCD sensor 220 for the duration of one scan, and signals for the three colors R, G, B can be read-out sequentially, as shown in FIG. 4.

The signals read-out from the CCD sensor 220 are converted to digital signals by means of the analog/digital conversion circuit 222 in the image processing device 250. Next, the poor spatial frequency response caused by the image forming lens 218 and the CCD sensor 220 is corrected by the outline enhancing circuit 224, the exposure for each picture element being determined by the color correction computing circuit 226, and the exposure for each color is controlled by means of the exposure control circuit 228. The three colors can be emitted in combination from the exposing device 300 to expose the photosensitive material along the optical axis.

The red light in the exposing device 300 is provided by a semiconductor laser 251 which emits laser light of wavelength 1300 nm and a second harmonic generating element (referred to below as an SHG element) 225 which halves the wavelength of this laser light. The semiconductor laser 251 is, for example, an NDL 5004 made by the Nippon Denki Co. The SHG element is a LiNbO$_3$ optical wave guide type element which halves the wavelength of the incident laser light and emits a red light beam of wavelength 650 nm. The laser light of wavelength 650 nm emitted from the SHG element 255 is shaped by passing through collimator lens 258 and then it is directed onto the polygonal mirror 270 by the fully reflecting mirror 261 and reflected.

The green light is provided by halving, by means of the SHG element 256, the wavelength of the laser light of wavelength 1064 nm emitted by the nd: YAG crystal 254 which is being excited by the GaSsxP$_{(1-x)}$ (sic) semiconductor laser 252. The laser light emitted from the Nd: YAG crystal is converted to a wavelength of 532 nm by the SHG element 256, shaped by passing through the collimator lens 259 and then directed onto the polygonal mirror 270 by the dichroic mirror 262 which transmits red light and reflects green light.

The blue light is provided by means of a semiconductor laser 253 which emits laser light of wavelength 850 nm and the SHG element 257 which halves the wavelength of this laser light. The semiconductor laser 253 is, for example, an NDL 3108 made by the Nippon Denki Co. The laser light wavelength 425 nm which is emitted by the SHG element 257 is shaped by passing through the collimator lens 260 and directed onto the polygonal mirror 270 by the dichroic mirror 263 which transmits red light and green light and reflects blue light.

The above mentioned red light, green light and blue light follow the same optical path 264, and are reflected by the polygonal mirror 270, passed through the f$\theta$ lens 280, reflected by the mirror 270 and reach the photosensitive material S. The image forming light scans and exposes the photosensitive material S by rotating the polygonal mirror 270 about the shaft 271. The image can thus be formed by moving the photosensitive material S in the direction at right angles to the scanning direction of the laser light.

The exposing device 300 is not dependent on laser light as described above, and a tri-color liquid crystal shutter array or three plasma arrays, light emitting diodes etc. could be used for this purpose.

This image recording apparatus operates in the following way. In the preparatory stage, known as the copy preparatory stage, the leading end part of the photosensitive material S is set in such a way that it is in the vicinity of the cutting part of cutter unit 23 or inside the magazine dark box 20. Then, when the copy start button is pressed, the photosensitive material delivery rolls 22 operate to feed the photosensitive material S such that the leading end part reaches the exposure position 32. Exposure described above is started at this time. The image reading device 200 and the image processing device 250 are linked together by means of electrical signals and are located together in a normally dark chamber. Only the transportation of the photosensitive material and the exposure start timing are controlled, there being no need to establish a shutter. On the other hand, the cutter unit 23 operates when the photosensitive material S has been fed a distance equal to the length in the direction of movement of the original document to produce a properly sized photosensitive material S.

The exposed and cut photosensitive material S is fed into the turning device 40 and turned over while in press contact with the feed rolls 33 by means of the endless belt 50. When the leading end part of the photosensitive material S has been turned over it is detected by the photosensitive material leading and detecting sensor 34.

The image receiving paper C is delivered in synchronization with the pressing of the copy start button or the timing of the start of the exposure by the image receiving paper supply device 56, and the leading end part is fed to the position where it is being nipped by the press contact roll 102 and the nip roll 103 and stops.

The image receiving paper C is narrower than the photosensitive material S and is located in the middle, in the width direction of the wider photosensitive material S, in the photosensitive material/image receiving paper laminating device 64. The leading end part of the photosensitive material S is laminated level with, or a few millimeters in advance of, the leading end part of the image receiving paper C and fed into the thermal development and transfer device 100 where thermal transfer onto the image receiving paper is carried out.

After this transfer, the photosensitive material S is peeled off the image receiving paper C by the peeling belts 89 in the peeling device 84 and fed into the photosensitive material reservoir 93. On the other hand, the image receiving paper C is fed into the retrieval tray 98 by the feed rolls 95, 96.

In the first illustrative example described above, the thermal development and transfer device 100 provides heating by means of the heating rollers 66, 67, 68, but belt heating, heating with hot belts with heaters arranged in the form of wires, electrical heating, drum heating, or irradiation with microwaves or infrared radiation can be used in place of the heating rollers. Furthermore, depending on the photosensitive material S, heating can be achieved using eddy currents generated by electromagnetic induction. Heating can also be achieved in a bath containing a heated liquid which is inert with respect to the photosensitive material S, for example a heated fluorine based liquid. In such cases the heating temperature is generally within the range from 60° C. to 200° C., and preferably in the range from 80° C. to 160° C.

The aforementioned outline enhancement circuit 224 corrects the image by obtaining the tonal values Ri', Gi', Bi' after correction for the i$^{th}$ picture element on the basis of the equations indicated below. In these equations $\alpha$ and $\beta$ are correction coefficients which differ according to the color.

$$Ri' = \alpha_R R_i - \beta_R(R_{i-1} + R_{i+1})$$

$$Gi' = \alpha_G R_i - \beta_G(R_{i-1} + R_{i+1})$$

$$Bi' = \alpha_B R_i - \beta_B(R_{i-1} + R_{i+1})$$

Furthermore, the color correction computing circuit 226 determines the exposures Ci, Mi, Yi for each picture element on the basis of the following equation:

$$\begin{bmatrix} Ci \\ Mi \\ Yi \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Ri \\ Gi \\ Yi \end{bmatrix}$$

Here $a_{11}-a_{33}$ are the correction coefficients with which the characteristics of the filters, etc. are taken into account.

Furthermore, the color correction computing circuit 226 provides an automatic color balance setting mode. That is to say, a pattern which has the prescribed hue, chroma and brightness is irradiated from the exposing device 300. The hue, chroma and brightness of the image receiving paper onto which the pattern has been transferred are measured using the sensor 400 which is established downstream of the peeling part 84, the results are compared with the prescribed values, and the correction coefficients of the color correction computing circuit 226 are adjusted. In the sensor 400, the image of the image receiving paper is illuminated by the lamp 402, as shown in FIG. 5, and the reflected light is splitup with color separating filters 403 and the light is converted to analog signals by means of a photoelectric conversion element 404, such as a CCD, photodiode or an amorphous silicon diode etc., and the analog signals are digitized by means of the computing circuit 405.

A block diagram of the computing circuit 405 is shown in FIG. 6. Here 404 is a photoelectric conversion element which converts red light, 406 is a computing amplifier which converts current to a voltage, 407 is an analogue switch, 408 is a sample hold circuit, 409 is an A/D converter, 410 and 412 are photoelectric conversion elements for green light and blue light respectively, and 411 and 413 are the computing amplifiers for the said elements. The microprocessor 414 compares the digital signals from the computing circuit 405 with standard signals, modifies the values of $a_{11}-a_{33}$ in the color correction computing circuit 226 and thus controls the correction. Furthermore, the modification of $a_{11}-a_{33}$ is carried out on the basis of a look-up table (LUT).

Furthermore, the determination of the correction coefficients for the color correction computing circuit 226 is not only involved in the automatic color balance setting mode described above. The correction coefficients $a_{11}-a_{33}$ can be modified on-line without setting the special color balance mode by detecting, through the CCD sensor 220, regions in which the hue, chroma and brightness are constant on the original document, measuring with the aforementioned sensor 400 the hue, chroma and brightness in the regions on the image receiving paper C after transfer corresponding to these regions, and setting the correction coefficients $a_{11}-a_{33}$ in such a way that the values of the image receiving paper detected by the sensor 400 are the same as the values of the main scan lines.

Furthermore, in the illustrated example described above, the photosensitive material S is cut with the cutter unit 23 as it is exposed, but a take-up roll can be provided in place of the reservoir 94 and the cutter unit 23 can be omitted. Also cut sheet type photosensitive material of the prescribed length can be used in place of the roll like photosensitive material. In this case the cutter unit for cutting the photosensitive material can be omitted. Additionally, image receiving paper wound into a roll and cut to the prescribed length can be used in place of the cut sheet like image receiving paper. In this case a cutter unit for cutting the image receiving paper is established in front of the image receiving paper supply device.

In the embodiment as described above, three pairs of heating rollers 66, 67 and 68 and two pairs of heating guides 78 and 80 are used for drying the photosensitive material and the image receiving paper in the thermal development and transfer device 100. However, the thermal development and transfer device of this invention is not limited to the above construction. For example, it may comprise one heating drum and an endless belt wound round the heating drum as shown in FIG. 7. In FIG. 7, characters D and B represent a heating drum and an endless belt partially wound round the periphery of the heating drum, respectively. In this case, the photosensitive material and the image receiving paper are contacted by the photosensitive material/image receiving paper laminating device and are fed into the entrance $P_1$ of the contact portion of the drum and the endless belt. They are carried along the periphery of the drum (the portion of an arc $P_1P_2$) while they are heated by the heating drum, and then are extracted from the exit $P_2$ of the contact portion.

By means of this invention it is possible to obtain not only copies of color originals which contain text, diagrams, symbols, and other images, but also to obtain high quality reproductions of color photographic images easily and inexpensive. Moreover, this invention is effective for obtaining high quality copy images with a desirable image signal treatment since the original document is scanned and tri-color separation signals are obtained. Furthermore, by means of this invention, the photosensitive material is shielded completely from the external light by mechanical means so there is no risk of photosensitive material fogging and bright image recordings can be obtained.

What is claimed is:

1. A copy apparatus comprising:
   image reading means for photoelectrically reading an original image and generating image signals;
   image signal processing means for electrically subjecting said image signals to predetermined processings which are corrected according to data read by a sensor from a transferred prescribed pattern on an image receiving material,
   exposing means for exposing a thermally developable photosensitive material in accordance with processed image signals; and
   thermal development and transfer means for thermally developing said exposed photosensitive material and thermally transferring the developed image from said exposed photosensitive material to said image receiving material, wherein said sensor compares said data from said transferred image pattern with prescribed values, and correction coefficients of said image processing means are corrected based on a difference between said data and said prescribed values.

2. The copy apparatus as claimed in claim 1 wherein said original image is a multi-colored image and said image reading means comprises:
   an illuminating lamp which scans a light beam across a surface of an original image scanning mirror means for reflecting the light from the illuminating lamp scanned across a surface of said original image;
a filter means, responsive to the reflected light, for dividing said reflected light into a time divided color separation and
photoelectric conversion means for converting said color separation into said image signals.

3. The copy apparatus as claimed in claim 2 wherein said image processing means comprises:
analog to digital converter means for converting said image signal;
outline enhancing means responsive to said digitized image signal for correcting the spatial frequency content of said image signal;
color correction means for correcting the color corresponding to each image element represented by the image signal; and
exposure control means for controlling the exposure content of each color of the color separation;
whereby a processed image signal is produced.

4. The copy apparatus as claimed in claim 3 wherein said exposing means comprises:
means responsive to said processed image signal for generating light corresponding in color to the colors of said color separation.

5. The copy apparatus of claim 4 wherein said color separation contains red, blue and green light, and said exposing means comprises:
a first semiconductor laser and a first second harmonic generating element for producing red light from said processed image signal in accordance with the red light content of said original image;
a second semiconductor laser, a Nd: YAG crystal excited by said second semiconductor laser, and a second second harmonic generating element for producing blue light;
a third semiconductor laser and a third second harmonic generating element for producing green light;
means for causing said produced red, blue and green light to follow the same optical path, and
scanning means for scanning the produced red, blue and green light on said thermally developable photosensitive material.

6. The copy apparatus as claimed in claim 1, wherein said thermal development and transfer means comprises:
means for receiving said exposed photosensitive material and said image receiving material superposed on each other;
heating rollers disposed to receive said superposed photosensitive material and image receiving material; and
heating guide plates to receive said superposed photosensitive material and image receiving material.

7. The copy apparatus as claimed in claim 6, wherein said heating rollers include first, second and third pairs of heating rollers and said heating guide plates include a first heating guide plate between said first and second pairs of heating rollers and a second heating guide plate between said second and third pairs of heating rollers.

8. The copy apparatus as claimed in claim 1, wherein said thermal development and transfer means comprises a heating drum and an endless belt wound round said heating drum, said exposed photosensitive material and said image receiving material being contacted and carried through the contact portion of said heating drum and said endless belt while they are heated.

9. The copy apparatus as claimed in claim 6 further including exposed photosensitive material transport means comprising:
a turning means for turning over said exposed photosensitive material and comprising an endless belt, belt support rolls positioned to form an arc of substantially 180°, a guide plate for guiding the exposed photosensitive material to said endless belt and an end detecting sensor for detecting the end of said photosensitive material.

10. The copy apparatus as claimed in claim 6 further including water coating means to coat said exposed photosensitive material with water before entering said thermal development and transfer means.

11. The copy apparatus as claimed in claim 6 further including peeling means for peeling the image receiving material from the photosensitive material after the superposed image receivng and photosensitive materials exit said thermal development and transfer means.

12. The copy apparatus of claim 10 wherein said water coating means coats said image receiving material with water before being superposed on said photosensitive material.

13. The copy apparatus of claim 3 wherein said multicolor image contains first (R), second (B) and third (G) colors and said outline enhancement means includes means for obtaining the tonal values $R_i'$, $G_i'$ and $B_i'$ for the $i^{th}$ picture element on the basis of the equations:

$$Ri = \alpha_R R_i - \beta_R(R_{i-1} + R_{i+1})$$

$$Gi = \alpha_G R_i - \beta_G(R_{i-1} + R_{i+1})$$

$$Bi = \alpha_B R_i - \beta_B(R_{i-1} + R_{i+1})$$

where $\alpha$ and $\beta$ are correction coefficients which differ for each color.

14. The copy apparatus of claim 13 wherein said color correction means includes means for determining the exposures $C_i$, $M_i$ and $Y_i$ for each picture element on the basis of the equation:

$$\begin{bmatrix} C_i \\ M_i \\ Y_i \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R_i \\ G_i \\ Y_i \end{bmatrix}$$

where $a_{11}$–$a_{33}$ are correction coefficients.

15. The copy apparatus as claimed in claim 8, further including exposed photosensitive material transport means comprising:
a turning means for turning over said exposed photosensitive material and comprising an endless belt, belt support rolls positioned to form an arc of substantially 180°, a guide plate for guiding the exposed photosensitive material to said endless belt and an end detecting sensor for detecting the end of said photosensitive material.

16. The copy apparatus as claimed in claim 8, further including water coating means to coat said exposed photosensitive material with water before entering said thermal development and transfer means.

17. The copy apparatus as claimed in claim 8, further including peeling means for peeling the image receiving material from the photosensitive material after the superposed image receiving and photosensitive materials exit said thermal development and transfer means.

18. The copy apparatus of claim 16, wherein said water coating means coats said image receiving material with water before being superposed on said photosensitive material.

* * * * *